United States Patent
Chen et al.

[19]

[11] Patent Number: 6,071,604

[45] Date of Patent: Jun. 6, 2000

[54] PROCESS FOR MAKING A BICYCLE FRAME WITH A LIGHT-REFLECTIVE COATING AND A LIGHT-REFLECTIVE BICYCLE FRAME MADE THEREFROM

[75] Inventors: Jeff Chen, Taichung Hsien; Honda Cheng, Miao-Li Hsien, both of Taiwan

[73] Assignee: Giant Manufacturing Co., Ltd., Taiwan

[21] Appl. No.: 09/026,646

[22] Filed: Feb. 20, 1998

[51] Int. Cl.⁷ .................. B32B 5/16; B05D 5/06
[52] U.S. Cl. ............ 428/323; 427/161; 427/180; 427/191; 427/207.1; 427/212; 427/214; 427/337; 427/372.2; 427/410; 427/420; 427/421; 427/435; 359/515; 359/548; 359/550; 29/897.2
[58] Field of Search ................ 427/161, 180, 427/191, 207.1, 212, 214, 337, 372.2, 410, 420, 421, 435; 359/515, 548, 550; 29/897.2; 428/323

[56] References Cited

U.S. PATENT DOCUMENTS

| | | | |
|---|---|---|---|
| 4,097,639 | 6/1978 | Millar | 428/215 |
| 4,422,615 | 12/1983 | McManus | 248/475 |
| 5,448,402 | 9/1995 | Lorenzana | 359/550 |

*Primary Examiner*—Samuel A. Acquah
*Attorney, Agent, or Firm*—Harness, Dickey & Pierce, P.L.C.

[57] ABSTRACT

A process for making a light-reflective bicycle frame and a light-reflective bicycle frame made therefrom are provided. The process includes: preparing a bicycle frame, providing a transparent adhesive layer on the bicycle frame, spreading uniformly light-reflective particles on the transparent adhesive layer to form a light-reflective particle layer which is substantially free of any superimposed or overlapping particles, and providing a transparent protective layer on the light-reflective particle layer.

8 Claims, 5 Drawing Sheets

PROCESS FOR MAKING A BICYCLE FRAME WITH A LIGHT-REFLECTIVE COATING AND A LIGHT-REFLECTIVE BICYCLE FRAME MADE THEREFROM

BACKGROUND OF THE INVENTION

1. Field of the Invention

The present invention relates to a process for making a bicycle frame having a light-reflective coating and to a light-reflective bicycle frame made therefrom.

2. Description of the Related Art

A light-reflective plate or an adhesive light-reflective paper is usually attached on a bicycle frame to result in light-reflective and signaling effects for enhanced driver safety. Since the light-reflective plate or the light-reflective paper is usually provided on certain areas of the bicycle frame, the generated reflected light might be affected by the angle of the incident light and by the point of view. Therefore, the light-reflective effect achieved by the light-reflective paper or the light-reflective plate is limited and unsatisfactory. Moreover, the adhesive light-reflective paper tends to shrink, to curl up and to be easily stripped from the surface of the bicycle frame due to weather and temperature factors. Aging of the light-reflective plate might reduce the light-reflective effect achieved thereby and may result in cracking of the same.

In view of the problems encountered by the conventional adhesive light-reflective papers and light-reflective plates, a process for forming a light-reflective coating on a bicycle frame has been proposed. Referring to FIGS. 1 and 2, the process comprises:

Pre-treatment: The surface of the bicycle frame 10 is cleaned by subjecting the bicycle frame 10 to a cleaning process to remove grease and undesirable solids, which step is the so-called phosphate cleaning process, and to provide a cleaned surface 11 that subsequently undergoes a drying step.

Gloss treatment: A glossy surface 12 is provided on the cleaned surface 11 by polishing the cleaned surface, or by providing a silver coating on the unpolished, cleaned surface, and the glossy surface 12 is subsequently dried.

Preparation of a light-reflective paint: A paint 14 is mixed with light-reflective particles 13 to form a sprayable light-reflective paint.

Spraying: The light-reflective paint is sprayed on the glossy surface 12 of the bicycle frame 10, and the sprayed paint layer is subsequently dried.

Facing layer treatment: A facing layer 15 is provided on the light-reflective paint, and the facing layer 15 is subsequently dried.

Post-treatment: A label 16 is attached to the protective layer 15, a finishing layer 17 is applied on the label 16, and the finishing layer 17 is subsequently dried.

Accordingly, when light strikes the surface of the bicycle frame having the light-reflective coating prepared from the aforementioned process, the light can be reflected by the light-reflective particles 13.

The aforementioned process has the following drawbacks:

Referring to FIG. 2, since the light-reflective particles 13 are mixed with the paint 14 to form the light-reflective paint, the light-reflective layer can include areas in which the particles 13 are stacked or superimposed and areas in which the light-reflective particles 13 are sparse. When light strikes an area having superimposed particles 13, reflection is poor because light is dispersed due to the different reflection angles of adjacent particles 13. When light strikes an area with sparse light-reflective particles 13, reflection is ineffective. Therefore, the aforementioned process is not satisfactory.

SUMMARY OF THE INVENTION

The main object of the present invention is to provide a process for making an efficient light-reflective bicycle frame by which the reflection effects of light-reflective particles do not interfere with one another.

Another object of the present invention is to provide a process for forming a light-reflective coating on a bicycle frame.

Still another object is to provide a light-reflective bicycle frame having a light-reflective coating.

According to a first aspect of the present invention, a process for making a light-reflective bicycle frame is provided. The process comprises: preparing a bicycle frame; providing a transparent adhesive layer on the bicycle frame; spreading uniformly light-reflective particles on the transparent adhesive layer to form a light-reflective particle layer which is substantially free of any superimposed or overlapping particles; and providing a transparent protective layer on the light-reflective particle layer.

According to a second aspect of the present invention, a process for forming a light-reflective coating on a bicycle frame is provided. The process comprises: providing a transparent adhesive layer on the surface of the bicycle frame; spreading uniformly light-reflective particles on the transparent adhesive layer to form a light-reflective particle layer which is substantially free of any superimposed or overlapping particles; and providing a transparent protective layer on the light-reflective particle layer.

According to a third aspect of the present invention, a light-reflective bicycle frame includes a bicycle frame, a transparent adhesive layer provided on a surface of the bicycle frame, a light-reflective particle layer which includes light-reflective particles that are spread uniformly on the transparent adhesive layer, the light-reflective particle layer being substantially free of any superimposed or overlapping particles, and a transparent protective layer superimposed on the light-reflective particle layer.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
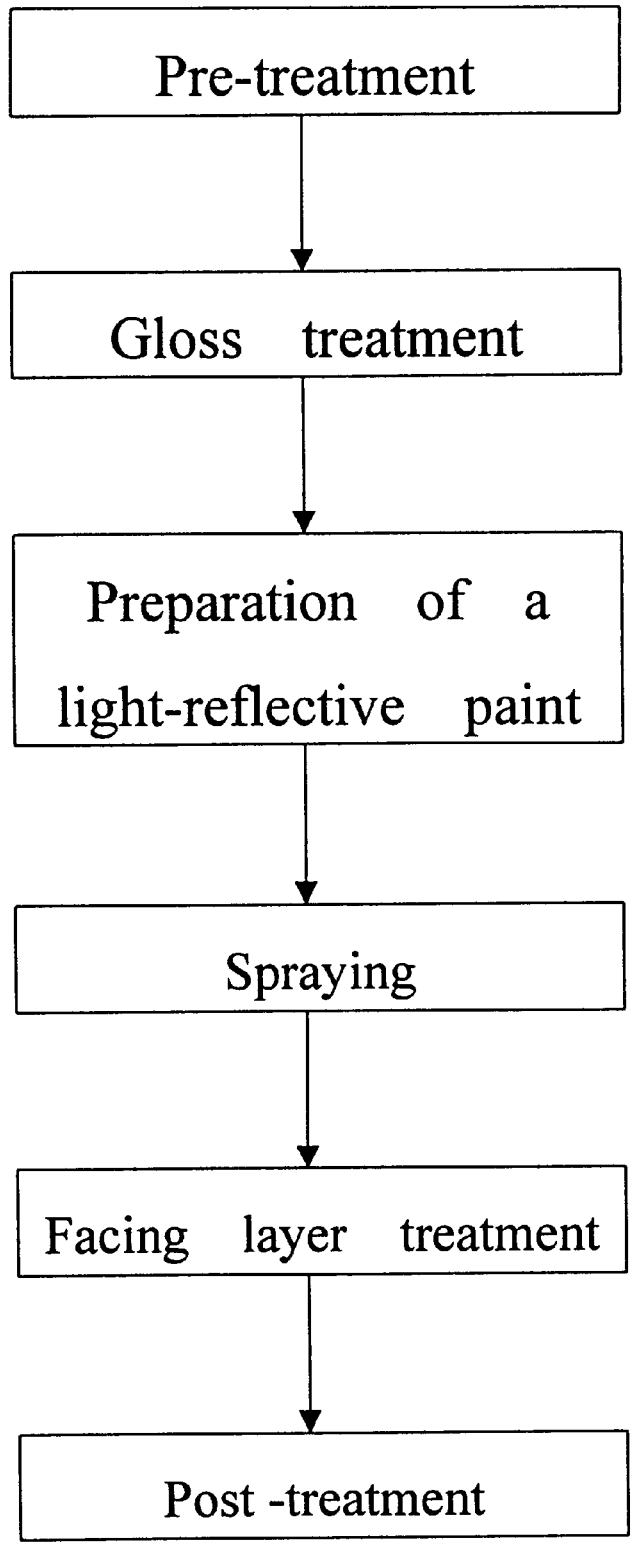
FIG. 1 is a flow-chart of a conventional process for forming a light-reflective coating on a bicycle frame.
Figure 2:
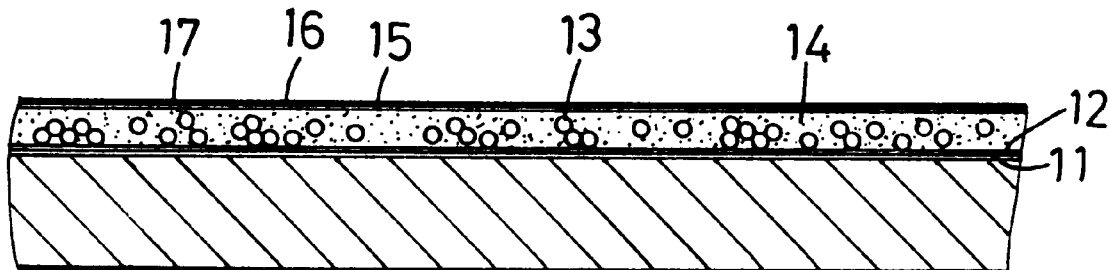
FIG. 2 is a sectional view of the light-reflective coating formed by the conventional process.
Figure 4:
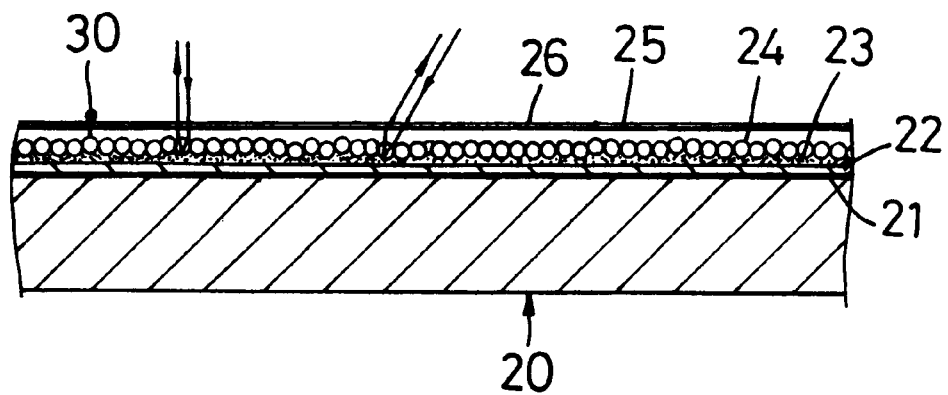
FIG. 4 is a sectional view of the light-reflective coating that is formed on the bicycle frame made from the process of the preferred embodiment.
Figure 3:
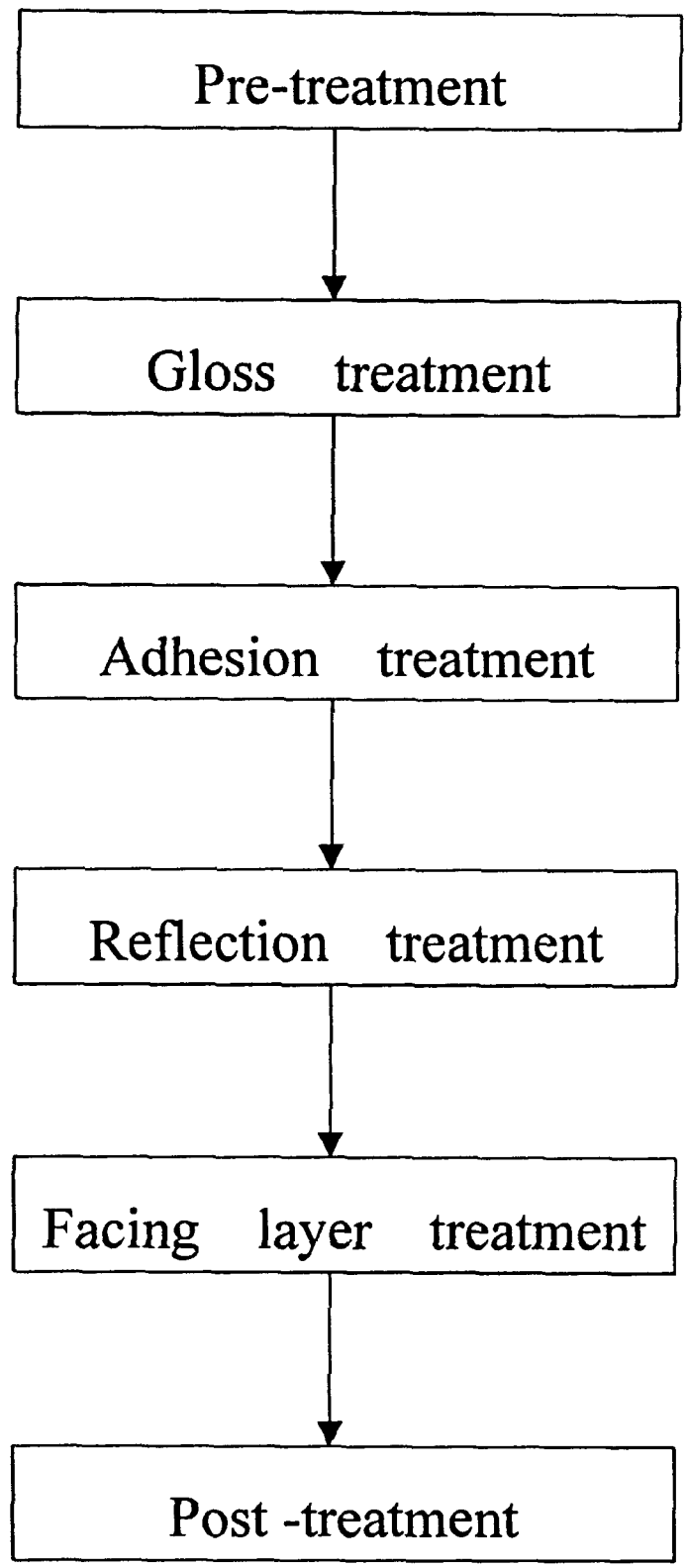
FIG. 3 is a flow-chart of a preferred embodiment of a process for forming a light-reflective bicycle frame according to the present invention.

Referring to FIGS. 3 and 4, the steps involved in the preferred embodiment of a process for forming a light-reflective bicycle frame according to the present invention are shown to include the following:

Pre-treatment: A bicycle frame 20 is subjected to an electrolytic cleaning process with a cleaning solution that contains phosphate for removal of grease and undesirable solids to provide a cleaned surface 21 on the bicycle frame 20. The cleaned surface 21 of the bicycle frame 20 is then dried via a known drying operation.

Gloss treatment: A glossy surface 22 is provided on the cleaned surface 21 of the bicycle frame 20. In case the bicycle frame 20 is made of aluminum, the cleaned surface 21 of the bicycle frame 20 is directly polished to result in the glossy surface 22. In case the bicycle frame 20 is made of iron, a silver coating is formed on the cleaned surface 21 of the bicycle frame 20 to result in the glossy surface 22. The glossy surface 22 is then dried via a known drying operation.

Adhesion treatment: A transparent adhesive layer 23 of epoxy resin is applied on the glossy surface 22 of the bicycle frame 20. The epoxy resin has a viscosity of 10" to 12", measured by IWATA NK-2 viscosity meter made in Japan.

Reflection treatment: Light-reflective particles 30 are spread uniformly on the transparent adhesive layer 23 so that the light-reflective particles 30 are attached on the entire surface of the transparent adhesive layer 23 to form a light-reflective particle layer. The light-reflective particles 30 are in the form of dry powder with a high density, a high refractive index, a high transparency and a smooth surface. The light-reflective particles 30 provide excellent reflectivity that cannot be achieved by the pearl and silver particles that are in common use.

Facing layer treatment: A colored or colorless transparent facing layer 24 is applied on the light-reflective particle layer, and the facing layer 24 is subsequently dried.

Post-treatment: A label 25 is attached to the transparent facing layer 24, a transparent finishing layer 26 is applied over the label 25, and the finishing layer 26 is subsequently dried. The finishing layer 26 serves as a protective layer for the label 25.

Figure 5:
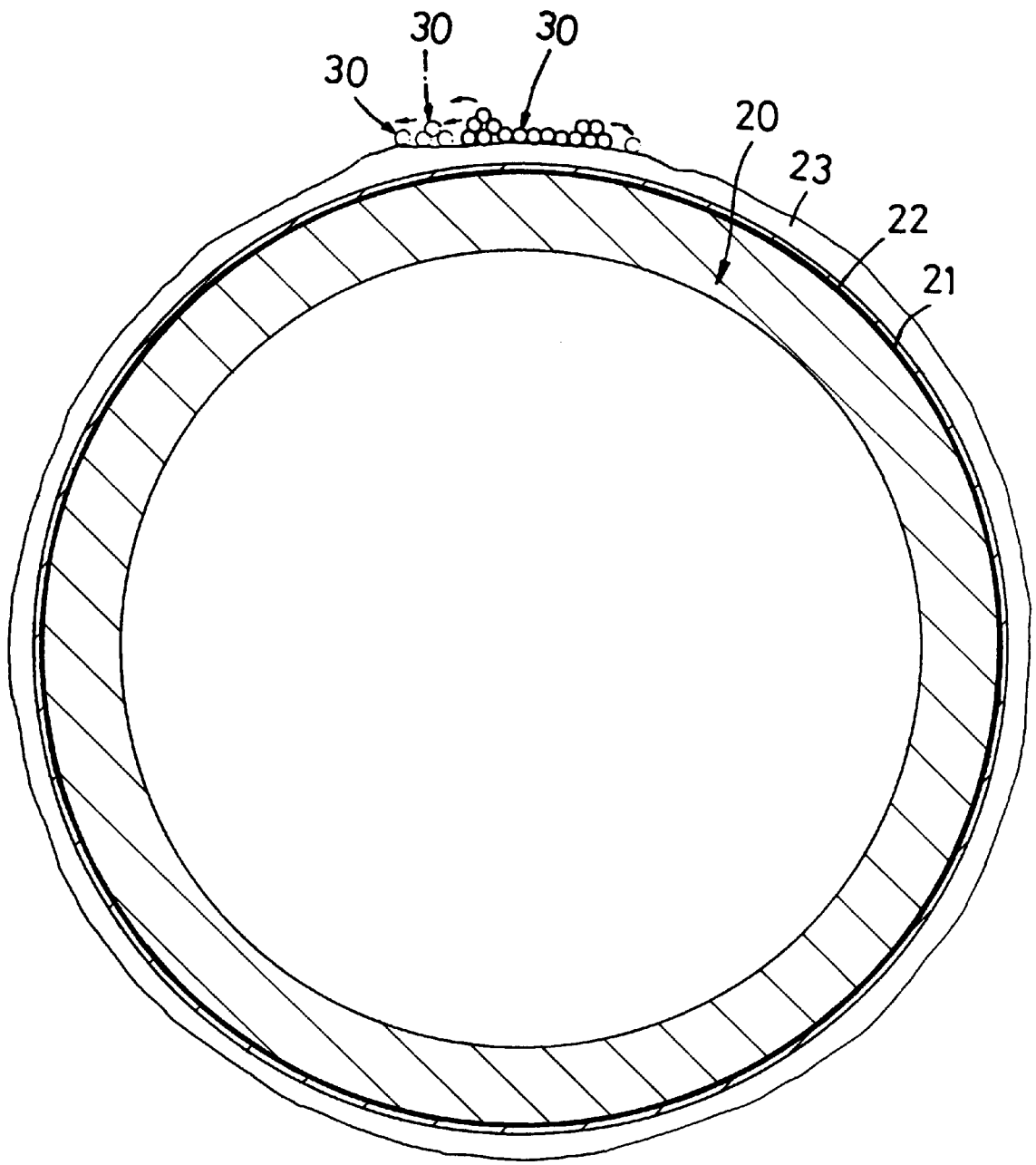
FIG. 5 is an enlarged, cross-sectional schematic view illustrating how light-reflective particles are spread uniformly on the bicycle frame in the process of the preferred embodiment.

The transparent adhesive layer 23 has a suitable viscosity to permit attachment of the light-reflective particles 30 on the surface thereof and to prevent embedding of the light-reflective particles 30 into the transparent adhesive layer 23. Referring to FIG. 5, since the light-reflective particles 30 have high densities and smooth surfaces, when the light-reflective particles 30 are attached on the transparent adhesive layer 23 to cover the same, excess particles 30 cannot be attached to the light-reflective particle layer and will be dropped therefrom by virtue of gravity. As such, the light-reflective particle layer is substantially free of any superimposed or overlapping particles. A collecting pan (not shown) may be provided below the bicycle frame during the reflection treatment for collecting excess light-reflective particles 30 for reuse.

Figure 6:
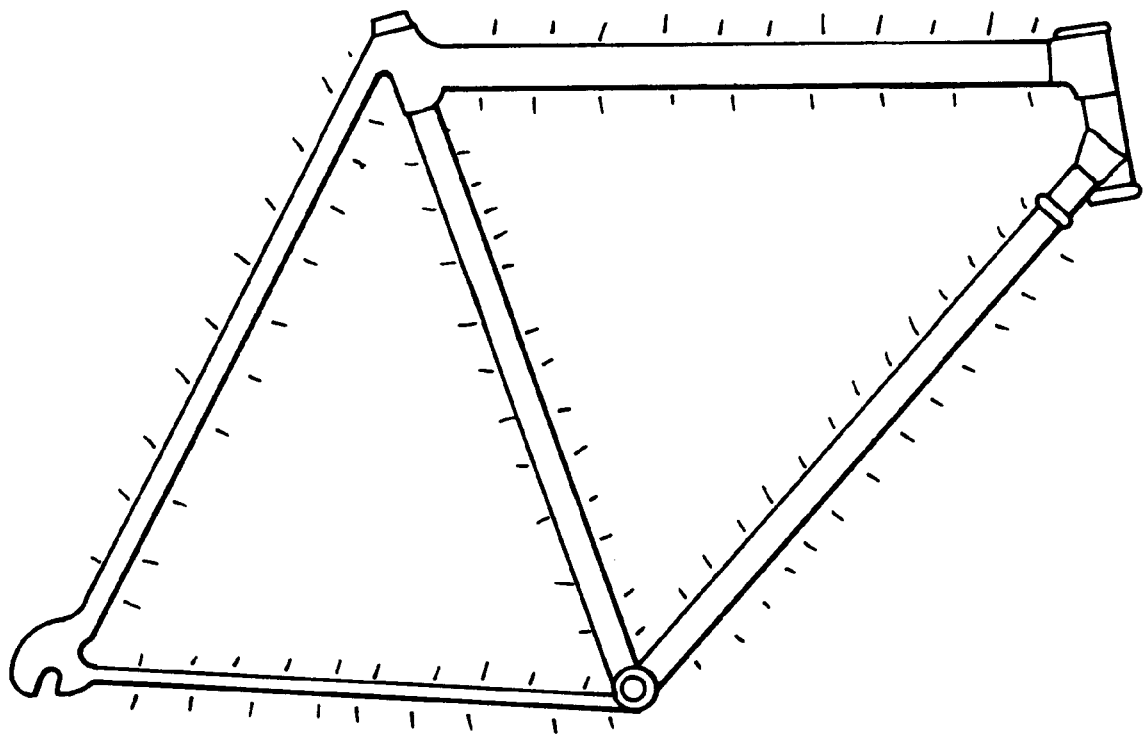
FIG. 6 illustrates the light-reflective bicycle frame made from the process of the preferred embodiment.

Referring to FIG. 6, when light is incident upon the light-reflective bicycle frame made according to the present invention, a relatively uniform and bright reflected light can be generated to provide an enhanced signaling effect as compared to the conventional bicycle frame having a light-reflective coating formed from the aforementioned prior art process.

The process of the present invention has the following advantages:

1) The light-reflective coating provides excellent reflectivity to result in an illuminating effect similar to a fluorescent lamp since the light-reflective particles 30 can be distributed uniformly on the whole surface of the bicycle frame and since the light-reflective particle layer is substantially free of any superimposed or overlapping particles.

2) The light-reflective coating can be applied on the whole bicycle frame rather than only on certain areas of the bicycle frame as in the conventional process.

3) Since excess light-reflective particles 30 are not attachable to the light-reflective particle layer and can be collected for reuse, the light-reflective particles 30 can be used efficiently to result in cost-savings.

With this invention thus explained, it is apparent that numerous modifications and variations can be made without departing from the scope and spirit of this invention. It is therefore intended that this invention be limited only as indicated in the appended claims.

We claim:

1. A process for making a light-reflective bicycle fame comprising:

preparing a bicycle frame;

providing a transparent adhesive layer on said bicycle frame;

thereafter spreading solely and uniformly dry light-reflective particles on said transparent adhesive layer and contacting directly the particles with said transparent adhesive layer and allowing some of said dry light-reflective particles which do not contact said transparent adhesive layer to fall off said transparent adhesive layer by gravity, thereby forming a light-reflective particle layer which is substantially free of any superimposed or overlapping particles; and providing a transparent protective layer on said light-reflective particle layer.

2. The process according to claim 1, wherein said light-reflective particle layer is free of an area where said light-reflective particles are sparse.

3. The process according to claim 1, wherein said bicycle frame is cleaned and polished to have a glossy surface before said transparent adhesive layer is provided.

4. The process according to claim 1, wherein said bicycle frame is cleaned and then provided with a gloss coating to form a glossy surface before said transparent adhesive layer is provided.

5. The process according to claim 1, further comprising:

attaching a label to said transparent protective layer and forming a transparent finishing layer on said label.

6. The process according to claim 1, wherein said transparent adhesive layer in said step (b) includes an epoxy resin having a viscosity of about 10" to about 12", measured by IWATA NK-2 viscosity meter.

7. A process for forming a light-reflective coating on a bicycle frame, comprising:

providing a transparent adhesive layer on the surface of said bicycle frame;

spreading solely and uniformly dry light-reflective particles on said transparent adhesive layer and contacting directly the particles with said transparent adhesive layer and allowing some of said dry light-reflective particles which do not contact said transparent adhesive layer to fall off said transparent adhesive layer by gravity, thereby forming a light-reflective particle layer which is substantially free of any superimposed or overlapping particles; and providing a transparent protective layer on said light-reflective particle layer.

8. A light-reflective frame comprising:

a frame body having a high light reflective coating, said coating including a light-reflective particle layer which is substantially free of any superimposed or overlapping particle layer, said coating being prepared by the steps of:

providing a transparent adhesive layer on the surface of said frame body;

spreading solely and uniformly dry light-reflective particles on said transparent adhesive layer and contacting directly the particles with said transparent adhesive layer and allowing some of said dry light-reflective particles which do not contact said transparent adhesive layer to fall off said transparent adhesive layer by gravity, thereby forming a light-reflective particle layer which is substantially free of any superimposed or overlapping particles; and providing a transparent protective layer on said light-reflective particle layer.

\* \* \* \* \*